United States Patent Office 3,715,112
Patented Feb. 6, 1973

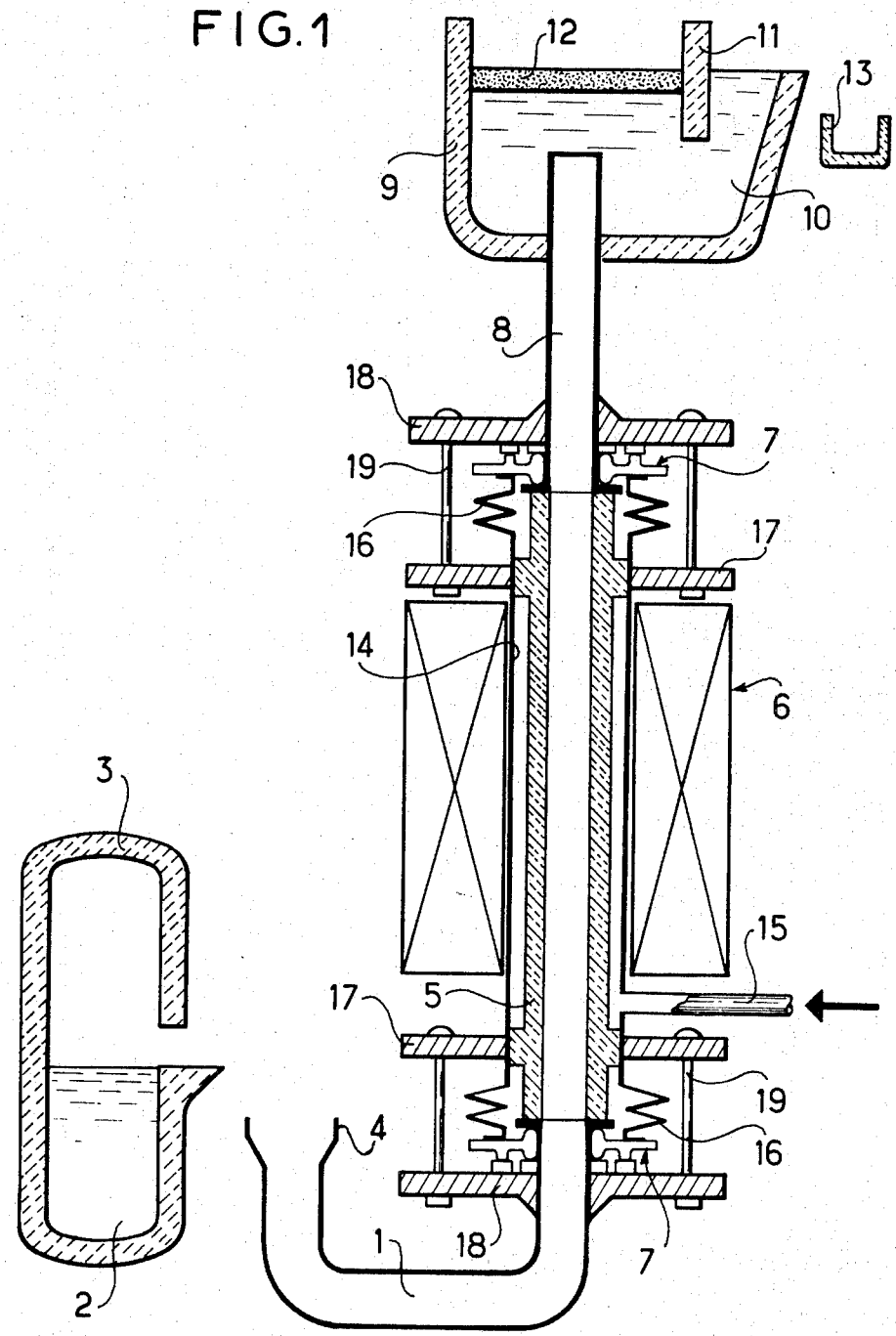

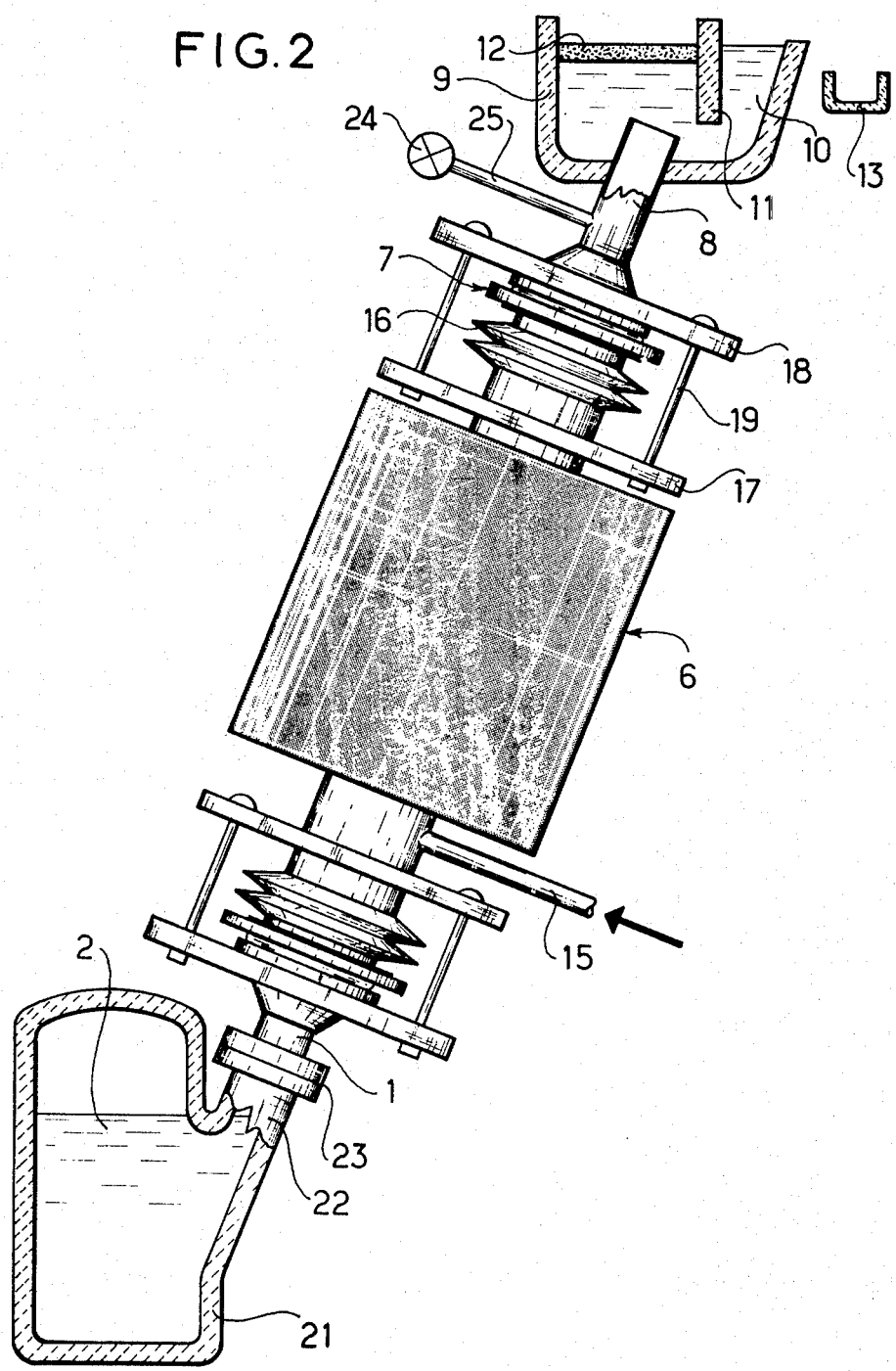

3,715,112
MEANS FOR TREATING A LIQUID METAL AND PARTICULARLY ALUMINUM
Henri Carbonnel, Antony, France, assignor to Groupement Atomique Alsacienne Atlantique, Plessis Robinson, France
Filed July 30, 1971, Ser. No. 167,736
Claims priority, application France, Aug. 4, 1970, 7028793
Int. Cl. C22b 21/06
U.S. Cl. 266—34 T
9 Claims

ABSTRACT OF THE DISCLOSURE

Apparatus for treating liquid metal, such as aluminum, with a gas, comprising an input pipe and an output pipe connected together by the conduit of an electromagnetic pump. The conduit is made of a porous refractory material arranged inside a fluid-tight tube receiving the treating gas under pressure. The treating gas entering the conduit is intimately mixed with the liquid metal by the currents induced by the windings of the pump.

BACKGROUND OF THE INVENTION

The present invention relates to a means for treating a liquid metal and particularly aluminum.

It is known to carry out the treatment of metals, such as particularly the aluminum generally obtained by igneous electrolysis, with a view to eliminating the impurities as well as the occluded gases, by causing a gas such as nitrogen or chlorine to bubble into the bath of liquid metal. The result of the stirring effect achieved in this way is the entrainment of the impurities and also of the gases towards the surface of the bath, on which the said impurities form a slag, while the gases escape into the ambient atmosphere.

The treatment gas being used is introduced by way of porous plugs which are generally disposed in the bottom of the furnace or of the ladle containing the aluminum bath.

However, the arrangements provided in this way have a certain number of disadvantages:

In particular, the stirring effected in such a manner is not sufficiently homogeneous, and this causes an incomplete elimination of the impurities and the gases from the metal.

Moreover, it is practically impossible in such arrangements to measure precisely the quantity of gas as a function of that of the metal, and this may cause secondary reactions which are prejudicial to the quality of the metal treated in this way.

Furthermore, it is necessary to use a holding furnace or ladle in addition to the melting furnace and this appreciably increases the overall cost of the installation.

SUMMARY OF THE INVENTION

The present invention permits the above disadvantages to be overcome:

It has for its object a means permitting the carrying out directly at the outlet from the melting furnace an efficient treatment of a metal such as aluminum and of obtaining in this way a metal having a particularly high degree of purity, the said means being of a particularly simple design and structure, associated with a high production rate.

The means for treating a metal and particularly aluminum with a gas, of the type comprising an inlet pipe carrying the impure liquid metal, an outlet pipe discharging the treated liquid metal into a crucible, the said pipes being connected by one of their ends to the conduit of an electromagnetic pump by means of joints, is characterized in that the said conduit is firstly made of a refractory material having a predetermined open porosity and, secondly, is disposed inside a substantially coaxial metal tube comprising sealing means, connected to a source of treatment gas under pressure, so that the said gas penetrating into the said conduit is intimately mixed co-jointly with the impure liquid metal by the currents induced by the windings of the said electromagnetic pump.

Such an arrangement has a certain number of advantages: One of these advantages results from the fact that the use of an electromagnetic pump as means for supplying a liquid metal permits an energetic and homogeneous stirring of the metal by the currents induced by the windings of the said pump to be measured. The consequence is that the impurities and the gases are entirely eliminated, and this permits a metal having a particularly high purity content to be obtained.

Another advantage arises from the fact that it is possible in such an arrangement to measure precisely the respective quantities of metal and treatment gas, and this enables the best possible treatment to be obtained.

Another advantage results from the fact that the treatment of the metal can be effected directly at the outlet from the melting furnace, which permits of avoiding the use of a holding furnace or ladle and consequently it is possible appreciably to increase production in existing installations.

Another advantage arises from the fact that such a means can be mounted on a movable carriage and in this way forms an independent member capable of being displaced according to requirements from one furnace to another furnace in the same plant.

BRIEF DESCRIPTION OF THE DRAWINGS

Other features and advantages of the invention will be apparent from the following description which is given simply as an illustrative example but without any limiting character, and by reference to the accompanying drawings and diagrams, in which:

FIG. 1 is an elevational view, partly in section, of a first embodiment of a treatment means for aluminum according to the invention, adapted to a rocking furnace; and FIG. 2 is an elevational view of a second embodiment of a treatment means for aluminum according to the invention, adapted to a fixed furnace.

DESCRIPTION OF THE PREFERRED EMBODIMENTS

As shown in FIG. 1, in a first embodiment, the means for treating a metal, such as aluminum, comprises essentially an inlet pipe 1 receiving the impure liquid metal 2 melted in a rocking furnace 3, this being effected by means of a receptacle 4. The pipe 1 is connected to one of the ends of a conduit 5 of an electromagnetic pump 6, made of a refractory ceramic material having a determined porosity, such as for example aluminum oxide or zirconium dioxide, such a connection being effected by means of a sealing joint indicated as a whole at 7. Such a joint has a structure similar to the joint claimed by the applicants in British Pat. application No. 58736/70 of Dec. 10, 1970.

The other end of the conduit 5 is connected by means of a joint 7, similar to the aforementioned joint, to the outlet pipe 8 which discharges into a crucible 9 receiving the treated liquid metal 10, such crucible comprising a partition 11 avoiding the slags 12 resulting from the treatment being poured into the conveying channel 13.

It can also be seen from FIG. 1 that the conduit 5 is disposed inside a substantailly coaxial metal tube 14 connected to a source of treatment gas (not shown) by means of the pipe 15, the sealing of such a chamber being effected by means of metal bellows 16 fixed to the ends of the tube 14 on one side and to the joints 7 on the other side.

It is also to be noted that the centering of the conduit 5 and the tube 14 along the axis of the magnetic field of the pump 6 is effected by means of bearings 17 fixed on flanges 18 supported on the pipes 1 and 8, respectively, such a function being assured by means of stay bolts 19.

The operation of such an arrrangement will be readily apparent from the description given by reference to FIG. 1.

The impure metal 2 originating from the furnace 3 is fed continuously by the electromagnetic pump 6. During the passage of the metal in the conduit 5 of the pump 6, the treatment gas underpressure, such as nitrogen or chlorine, diffuses through the wall of the conduit 5 and is intimately and energetically agitated with the metal under the influence of the currents induced by the windings of the pump. The metal is in this way strictly purified and the slags 12 which result therefrom are collected at the surface of the crucible 9, while the occluded gases escape into the ambient atmosphere.

The means forming the subject of the invention are shown in a vertical position in FIG. 1, but it is to be understood that the such means can be disposed in accordance with absolutely any direction.

FIG. 2 shows a second embodiment of an aluminum treatment means. In this embodiment, there is used a fixed furnace 21 comprising a conduit 22 fitted to the inlet pipe 1 by means of flanges 23.

In addition, the outlet pipe 8 has associated therewith an air ejector 24 by means of a pipe 25. The operation of such an arrangement is similar to that described by reference to FIG. 1, the only difference arising from the fact that the priming of the electromagnetic pump 6 is effected by means of the ejector 24.

Such an arrangement has the advantage of being strictly fluid-tight, the metal being protected from air during its treatment, and this provides appreciable advantages in certain cases.

The means forming the subject of the invention can be used in all those cases where the treatment of a liquid metal has to be effected with a high efficiency and a high production rate.

Consequently, it can be used with particular advantages in the field of metallurgy.

Although the arrangement which has just been described appears to be most advantageous for the use of the invention in a particular technical situation, it will be understood that certain modifications can be embodied therein without departing from the scope of the invention, certain of the elements thereof being capable of being replaced by others which will ensure the same technical function.

In particular, such a treatment means can be arbitrarily adapted to an induction electromagnetic pump or to a conduction electromagnetic pump.

What is claimed is:

1. In an apparatus for treating an impure liquid metal and particularly aluminum with a gas, of the type comprising an inlet pipe feeding the impure liquid metal, an outlet pipe discharging the treated liquid metal into a crucible, said pipes being connected by one of their ends to the conduit of an electromagnetic pump by means of joints; the improvement wherein said conduit is made of a refractory material having a predetermined open porosity and is disposed inside a substantially coaxial metal tube comprising sealing means, said metal tube being connected to a source of treatment gas under pressure, so that said gas penetrating into the said conduit is intimately mixed co-jointly with the impure liquid metal by the currents induced by the windings of said electromagnetic pump.

2. Apparatus according to claim 1, wherein said electromagnetic pump is of the induction type.

3. Apparatus according to claim 1, wherein said electromagnetic pump is of the conduction type.

4. Apparatus according to claim 1, wherein said inlet pipe comprises at its free end a receptacle receiving the liquid metal from a rocking furnace.

5. Apparatus according to claim 1 wherein said inlet pipe is connected by its free end to a fixed metal-melting furnace.

6. Apparatus according to claim 1, wherein said outlet pipe comprises a priming member for said electromagnetic pump, said member being formed by an air ejector.

7. Apparatus according to claim 1, wherein said sealing means of said metal tube are formed by metal bellows, each connected to one of the ends of the said metal tube, on the one hand, and to one of said joints, on the other hand.

8. Apparatus according to claim 1, wherein said conduit and said metal tube are centered on the axis of the field generated by said electromagnetic pump by means of bearings.

9. Apparatus according to claim 8, wherein said bearings are fixed on flanges secured to said inlet and outlet pipes.

References Cited
UNITED STATES PATENTS

| | | | |
|---|---|---|---|
| 2,809,107 | 10/1957 | Russell | 266—34 PP |
| 2,837,790 | 6/1958 | Rogian | 266—34 PT |
| 3,179,512 | 4/1965 | Olsson | 266—34 PT |

GERALD A. DOST, Primary Examiner

U.S. Cl. X.R.

266—34 PP